United States Patent
Drouin, Jr. et al.

(10) Patent No.: US 9,446,840 B2
(45) Date of Patent: Sep. 20, 2016

(54) SYSTEMS AND METHODS FOR ALLEVIATING AIRCRAFT LOADS WITH PLASMA ACTUATORS

(75) Inventors: Donald V. Drouin, Jr., O'Fallon, IL (US); Scott Lee Schwimley, Foristell, MO (US)

(73) Assignee: The Boeing Company, Chicago, IL (US)

( * ) Notice: Subject to any disclaimer, the term of this patent is extended or adjusted under 35 U.S.C. 154(b) by 1575 days.

(21) Appl. No.: 12/166,199

(22) Filed: Jul. 1, 2008

(65) Prior Publication Data

US 2010/0004799 A1   Jan. 7, 2010

(51) Int. Cl.
| | | |
|---|---|---|
| G06F 17/00 | (2006.01) | |
| B64C 21/00 | (2006.01) | |
| B64C 23/00 | (2006.01) | |
| H05H 1/24 | (2006.01) | |

(52) U.S. Cl.
CPC .......... *B64C 23/005* (2013.01); *H05H 1/2406* (2013.01); *B64C 2230/12* (2013.01); *Y02T 50/166* (2013.01)

(58) Field of Classification Search
CPC ............ B64C 2230/12; B64C 23/005; Y02T 50/166
USPC ....................... 701/3, 14; 244/201–205, 207, 244/198–199.1; 361/230
See application file for complete search history.

(56) References Cited

U.S. PATENT DOCUMENTS

| | | | |
|---|---|---|---|
| 3,095,163 A | 6/1963 | Hill et al. | |
| 3,620,484 A | 11/1971 | Schoppe et al. | |
| 3,831,052 A | 8/1974 | Knechtli | |
| 4,008,866 A | 2/1977 | Rethorst | |
| 4,109,218 A | 8/1978 | Schneider et al. | |
| 4,363,991 A | 12/1982 | Edelman | |
| 4,395,770 A | 7/1983 | Silfvast et al. | |
| 4,453,196 A | 6/1984 | Herr | |
| 4,749,151 A * | 6/1988 | Ball et al. | 244/53 B |
| 4,932,610 A | 6/1990 | Maestrello | |

(Continued)

FOREIGN PATENT DOCUMENTS

| | | |
|---|---|---|
| DE | 102006008864 A1 | 9/2007 |
| EP | 1926353 A1 | 5/2008 |

(Continued)

OTHER PUBLICATIONS

International Search Report and Written Opinion, International Application No. PCT/US09/45086, Applicant: The Boeing Company, mailed on Mar. 18, 2010, 13 pages.

(Continued)

*Primary Examiner* — Mussa A Shaawat
*Assistant Examiner* — Kyung Kim
(74) *Attorney, Agent, or Firm* — Perkins Coie LLP (57) ABSTRACT

Systems and methods for alleviating aircraft loads with plasma actuators are disclosed. A method for operating an aircraft in accordance with a particular embodiment includes receiving an input corresponding to an aircraft component structural response to an aerodynamic load. The method can further include, based at least in part on the input corresponding to the aircraft component's structural response, reducing the structural response to the aerodynamic load by activating at least one plasma actuator carried by the aircraft, in accordance with one or more activation parameters.

15 Claims, 5 Drawing Sheets

(56) References Cited

U.S. PATENT DOCUMENTS

| | | | |
|---|---|---|---|
| 5,082,207 A | 1/1992 | Tulinius | |
| 5,320,309 A | 6/1994 | Nosenchuck et al. | |
| 5,437,421 A * | 8/1995 | Nosenchuck et al. | 244/205 |
| 5,549,260 A | 8/1996 | Reed, III | |
| 5,797,563 A | 8/1998 | Blackburn et al. | |
| 5,803,409 A | 9/1998 | Keefe | |
| 5,828,684 A | 10/1998 | Van de Walle | |
| 5,901,928 A | 5/1999 | Raskob, Jr. | |
| 5,917,286 A | 6/1999 | Scholl et al. | |
| 5,934,622 A | 8/1999 | Meng | |
| 5,938,404 A | 8/1999 | Domzalski et al. | |
| 5,964,433 A | 10/1999 | Nosenchuck | |
| 6,079,345 A | 6/2000 | Tsunoda | |
| 6,200,539 B1 * | 3/2001 | Sherman et al. | 216/67 |
| 6,220,549 B1 | 4/2001 | Tsunoda et al. | |
| 6,247,671 B1 | 6/2001 | Saeks et al. | |
| 6,276,636 B1 | 8/2001 | Krastel | |
| 6,375,127 B1 | 4/2002 | Appa | |
| 6,518,692 B2 | 2/2003 | Schoenbach et al. | |
| 6,527,221 B1 | 3/2003 | Kremeyer | |
| 6,528,947 B1 | 3/2003 | Chen et al. | |
| 6,570,333 B1 | 5/2003 | Miller et al. | |
| 6,805,325 B1 * | 10/2004 | Malmuth et al. | 244/205 |
| 6,978,767 B2 | 12/2005 | Bonutti | |
| 7,017,863 B2 * | 3/2006 | Scott et al. | 244/205 |
| 7,066,431 B2 * | 6/2006 | Scott et al. | 244/134 D |
| 7,380,756 B1 * | 6/2008 | Enloe et al. | 244/175 |
| 7,624,941 B1 * | 12/2009 | Patel et al. | 244/3.22 |
| 7,641,153 B2 | 1/2010 | Smereczniak | |
| 7,703,479 B2 | 4/2010 | Jacob | |
| 7,744,039 B2 * | 6/2010 | Miles et al. | 244/205 |
| 7,870,720 B2 | 1/2011 | Hagseth et al. | |
| 7,988,101 B2 | 8/2011 | Osborne et al. | |
| 8,006,939 B2 | 8/2011 | McClure et al. | |
| 8,016,246 B2 | 9/2011 | Schwimley et al. | |
| 8,091,836 B2 | 1/2012 | Minick | |
| 8,091,950 B2 | 1/2012 | Corke et al. | |
| 8,251,312 B1 | 8/2012 | Daso et al. | |
| 8,308,112 B2 | 11/2012 | Wood et al. | |
| 2004/0118973 A1 * | 6/2004 | Malmuth et al. | 244/75 R |
| 2004/0144733 A1 | 7/2004 | Cooper et al. | |
| 2005/0224659 A1 | 10/2005 | Pitt | |
| 2006/0038087 A1 | 2/2006 | Minick et al. | |
| 2006/0115133 A1 * | 6/2006 | Potter et al. | 382/128 |
| 2006/0131282 A1 | 6/2006 | Miller et al. | |
| 2007/0018053 A1 * | 1/2007 | Enzinger et al. | 244/195 |
| 2007/0241229 A1 | 10/2007 | Silkey et al. | |
| 2008/0023589 A1 * | 1/2008 | Miles et al. | 244/205 |
| 2008/0067283 A1 * | 3/2008 | Thomas | 244/1 N |
| 2008/0096045 A1 | 4/2008 | Fairbourn et al. | |
| 2008/0116808 A1 | 5/2008 | McClure et al. | |
| 2008/0122252 A1 * | 5/2008 | Corke et al. | 296/180.2 |
| 2008/0290218 A1 | 11/2008 | Schwimley et al. | |
| 2009/0018703 A1 * | 1/2009 | Mangalam et al. | 700/282 |
| 2009/0173836 A1 | 7/2009 | Kremeyer | |
| 2009/0173837 A1 * | 7/2009 | Silkey et al. | 244/205 |
| 2010/0133386 A1 * | 6/2010 | Schwimley et al. | 244/205 |
| 2010/0284825 A1 | 11/2010 | Land, III et al. | |
| 2012/0193483 A1 | 8/2012 | Essenhigh et al. | |
| 2013/0001368 A1 | 1/2013 | Silkey et al. | |

FOREIGN PATENT DOCUMENTS

| | | |
|---|---|---|
| EP | 1953382 | 8/2008 |
| GB | 2244252 A | 11/1991 |
| RU | 2005133953 | 5/2007 |
| WO | WO-9410032 A1 | 5/1994 |
| WO | WO-2007054774 | 5/2007 |

OTHER PUBLICATIONS

Patel et al., "Plasma Actuators for Hingeless Aerodynamic Control of an Unmanned Air Vehicle," Journal of Aircraft, vol. 44, No. 4, Jul.-Aug. 2007, 11 pages.

U.S. Appl. No. 12/339,674, filed Dec. 19, 2008, Silkey et al.

A. A. Maslov, B. Yu. Zanin, A. A. Sideorenko, B.V Postnikov, V. P. Fomichev, A.D. Budovsky and N. Malmuth, "Two-Channel Spark Discharge for Flow Control on a Body of Revolution," AIAA Paper No. 2005-040, Reno NV, Jan. 10-13, 2005.

Anderson, R., Roy S., "Preliminary Experiments of Barrier Discharge Plasma Actuators using Dry and Humid Air," Paper AIAA2006-0369, 44th AIAA Aerospace Sciences Meeting and Exhibit, Reno, NV, Jan. 9-12, 2006.

Corke, T., "Plasma Flow Control Optimized Airfoil," Paper AIAA-2006-1208, 44th AIAA Aerospace Sciences Meeting and Exhibit, Reno, NV, Jan. 9-12, 2006.

Corke, T.C., Jumper E.J., Post, L.L., Orlov, D. and McLaughlin, T.E., "Application of Weakly-Ionized Plasma as Wing Flow-Control Device," Paper AIAA 2002-350, 40th AIAA Aerospace Sciences Meeting & Exhibit, Reno, NV Jan. 14-17, 2002.

D.V. Roupassov, I.N. Zavyalov, A.Yu. Starikov, "Boundary Layer Separation Plasma Control Using Low-Temperature Non-Equilibrium Plasma of Gas Discharge," 44-rd AIAA Aerospace Sciences Meeting and Exhibit, Reno, Nevada, USA, paper AIAA-2006-373, 2006.

Enloe, C.L., McLaughlin, T.E., VanDyken, R.D., Kachner, K.D., Jumper E.J., Corke, T.C., "Mechanisms and Responses of a Single Dielectric Barrier Plasma Actuator: Plasma Morphology," AIAA Journal, vol. 42, No. 3, 2004, pp. 589-594.

Enloe, C.L., McLaughlin, T.E., VanDyken, R.D., Kachner, K.D., Jumper E.J., Corke, T.C., Post, M. and Hadded, O., "Mechanisms and Responses of a Single Dielectric Barrier Plasma Actuator. Geometric Effects," AIAA Journal, vol. 42, No. 3, 2004, pp. 595-604.

Gaitonde, D., "A Coupled Approach for 3-D RF-Based Flow Control Stimulations," Paper AIAA-2006-1205, 44th AIAA Aerospace Sciences Meeting and Exhibit, Reno, NV, Jan. 9-12, 2006.

Likhanskii, A., Shneider, M., Macheret, S., and Miles, R., "Modeling of Interaction Between Weakly Ionized Near-Surface Plasmas and Gas Flow," Paper AIAA-2006-1204, 44th AIAA Aerospace Sciences Meeting and Exhibit, Reno, nevado, Jan. 9-12, 2006.

Loeb, L.B., "Ionizing Waves of Potential Gradients," Science 148, p. 1417, 1965.

Opaits, D.F., Roupassov, D.V., Starikovskaia, S.M., Starikovskii, A.Yu., Zavialov, I.N., and Saddoughi, S.G., "Plasma Control of Boundary Layer Using Low-Temperature Non-Equilibrium Plasma of Gas Discharge," Paper AIAA 2005-1180, 43rd AIAA Aerospace Sciences Meeting and Exhibit, Reno, NV, Jan. 10-13, 2005.

Orlov, D.M., and Corke, T.C., "Numerical Simulation of Aerodynamic Plasma Actuator Effects," Paper AIAA 2005-1083, 43rd AIAA Aerospace Sciences and Meeting and Exhibit, Reno, NV, Jan. 10-13, 2005.

Post, M., and Corke, T.C., "Flow Control with Single Dielectric Barrier Plasma Actuator" Paper AIAA 2005-4630, 35th AIAA Fluid Dynamics Conference and Exhibit, Toronto, Ontario, Jun. 6-9, 2005.

Post, M.L., and Corke T.C., "Separation Control on High Angle of Attack Airfoil Using Plasma Actuators," AIAA Journal, vol. 42, No. 11, 2004, pp. 2177-2184.

Roth, J.R., "Optimization of the Aerodynamic Plasma Actuator as an Electrohydrodynamic (EHD) Electrical Device," Paper AIAA-2006-1203, 44th AIAA Aerospace Sciences Meeting and Exhibit, Reno, NV, Jan. 9-12, 2006.

Roy, S., "Flow Actuation Using Radio Frequency in Partially Ionized Collisional Plasmas," Applied Physics Letters, vol. 86, 2005, pp. 1001502-1-101502-3.

Roy, S., and Gaitonde, D.V., "Modeling Surface Discharge Effects of Atmosphere RF on Gas Flow Control," Paper AIAA 2005-160, 43rd AIAA Aerospace Sciences Meeting and Exhibit, Reno, NV, Jan. 10-13, 2005.

Singh, K.P. and Roy, S., "Simulation of an Asymmetric Single Dielectric Barrier Plasma Actuator," Journal of Applied Physics, vol. 98, 2005, 083303-1-083303-7.

Zavyalov I.N., Roupassov D.V., Starikovsii A. Yu., Saddoughi S.G., "Boundary Layer Control" by Gas Discharge Plasma. EUCASS, Moscow, 2005.

(56) References Cited

OTHER PUBLICATIONS

"Atmospheric Absorption in UV Band," http://www.globalwarmingart.com/wiki/Image:Atmospheric_Transmission_png, Jun. 2007, 4 pages.

"Deep UV Lasers 224 and 248 nm," http://www.photonsystems.com/pdfs/duv-lasersource-rev2.pdf, 2 pages.

"FQCW 266 Diode Pumped Continuous Wave Solid State Laser," www.crylas.de, 2008, 2 pages.

Chen J., Park, S., Fan, Z., Eden, J. G., Liu, C., "Development and Characterization of Micromachined Hollow Cathode Plasma Display Devices," Journal of Microelectromechanical Systems, vol. 11, No. 5, Oct. 2002, pp. 536-543.

Oh, Hye-Keun, "Process Study of a 200 nm Laser Pattern Generator," Journal of the Korean Physical Society, vol. 41, No. 6, Dec. 2002, pp. 839-842.

Sidorenko, A.A., Boris, Y.Z., Boris, V.P., Budovsky, A.D., "Pulsed Discharge Actuators for Rectangular Wing Separation Control," American Institute of Aeronautics and Astronautics, 2007, pp. 1-11.

Boeuf, J. P., Pitchford, L.C., "Electrohydrodynamic force and aerodynamic flow acceleration in surface dielectric barrier discharge," Journal of Applied Physics 97, 103307, 2005, 10 pages.

Likhanskii, A.V., Shneider, M.N, Shneider, Miles, R.B., "Optimization of Dielectric Barrier Discharge Plasma Actuators Driven by Repetitive Nanosecond Pulses," Paper AIAA-2007-633, 45th AIAA Aerospace Science Meeting and Exhibit, Reno NV, Jan. 8-11, 2007.

"IV.30—Drift Step Recovery Diodes?" http://www.avtechpulse.com/faq/html/IV.30/ accessed Mar. 5, 2009, 1 page.

"MHE—Pulse Systems Group," http://www.moose-hill.com/pulse.htm, accessed Mar. 5, 2009, 4 pages.

Corke et al., "Order of Magnitude Improvement of SDBD Acuator Effect," AF Academy Workshop on Plasma Actuators, Nov. 8, 2006, 23 pages.

Hall, Kortny, "Potential Flow Model for Plasma Actuation as Lift Enhacement Device—A Thesis," Graduate Program in Aerospace and Mechanical Engineering, Notre Dame, Indiana, Jul. 2004, 119 pages.

Huang, Junhui, "Separation Control Over Low Pressure Turbine Blades Using Plasma Actuators—A Dissertation," Graduate Program in Aerospace & Mechanical Engineering, Notre Dame, Indiana, Jul. 2005, 194 pages.

Post, Martiqua L., "Plasma Actuators for Separation Control on Stationary and Oscillating Airfoils," Department of Aerospace and Mechanical Engineering, Notre Dame, Indiana, May 2004, 113 pages.

Roy et al., "Ionized Collisional Flow Model for Atmospheric RF Application," AIAA-2004-2354 AIAA Plasmadynamics and Laser Conference, Portland, Oregon, Jun. 28-Jul. 1, 2004, 9 pages.

Roy et al., "Multidimensional Collisional Dielectric Barrier Discharge for Flow Separation Control at Atmospheric Pressures," AIAA-2005-4631, 35th AIAA Fluid Dynamics Conference and 36th AIAA Plasma Dynamics and Laser Conference, Toronto, Canada, Jun. 2005, 10 pages.

Shang et al., "Mechanisms of Plasma Actuators for Hypersonic Flow Control," Progress in Aerospace Sciences, http://www.sciencedirect.com/science/article/pii/S0376042105001235, vol. 41, Issue 8, Nov. 2005, pp. 642-668.

Singh, K.P. and Roy, S., "Phase Effect on Flow Control for Dielectric Barrier Plasma Actuators," Applied Physics Letters, vol. 89, No. 1., Jul. 2006, 3 pages.

Corke, T.C., and Post, M.L., "Overview of Plasma Flow Control: Concepts, Optimization, and Applications," AIAA Paper No. 2005-563, Reno NV, Jan. 10-13, 2005.

J. Reece Roth and Xin Dai, "Optimization of the Aerodynamic Plasma Actuator as an Electrohydrodynamic (EHD) Electrical Device," AIAA Paper No. 2006-1203, Reno NV, Jan. 9-12, 2006.

Roth, J.R., Sherman D. M. and Wilkinson S. P.: "Boundary Layer Flow Control with a One Atmosphere Uniform Flow Discharge Surface Plasma". AIAA Paper 98-0328, Proc of the 36th AIAA Aerospace Sciences Meeting & Exhibit Reno, NV, Jan. 12-15, 1998.

Wu, J.-Z., Lu, X.-Y., Denny, A.G., Fan, M., and Wu, J.-M, "Post Stall Flow Control on an Airfoil by Local Unsteady Forcing," J. Fluid Mech., 371, 21-58, 1998.

* cited by examiner

SYSTEMS AND METHODS FOR ALLEVIATING AIRCRAFT LOADS WITH PLASMA ACTUATORS

TECHNICAL FIELD

The present disclosure is directed generally to systems and methods for alleviating aircraft loads, e.g., buffet loads, with plasma actuators.

BACKGROUND

During flight, a boundary layer of air builds up on the exposed surfaces of an aircraft. The boundary layer is a thin film of low velocity, low dynamic pressure air located near a solid boundary and resulting from the air being at rest along the solid boundary. The boundary layer which forms on surfaces located upstream of an aircraft engine can become ingested by the engine and decrease the recovery of total pressure and corresponding thrust performance. Further, the ingested boundary layer increases the flow distortion (a measurement of the quality or uniformity of flow characteristics) at the engine and thereby decreases the stability of engine operation. On the aircraft wing and/or other external surfaces of the aircraft, the boundary layer can increase skin friction and therefore drag. In some instances, the boundary layer can cause premature separation of the flow from the external surface, further increasing drag and/or reducing lift.

As a result of the foregoing drawbacks associated with boundary layers, many aircraft have employed some type of boundary layer removal, reduction, and/or control system to provide for stable engine operation and increased aerodynamic performance. Representative systems include boundary layer diverters, "bump" boundary layer deflectors, boundary layer bypass ducts, vortex generators, and porous surfaces or slots that either bleed boundary layer flow from the surface, or energize the flow by air injection. Unfortunately, these systems are often complex and can entail a substantial increase in aircraft weight and/or volume.

One recent technique for addressing boundary layer flow is to use a dielectric barrier discharge device (e.g., a plasma actuator) to energize and/or redirect the boundary layer flow. These devices operate by ionizing air adjacent to the flow surface in such a way as to generate or direct flow adjacent to the surface. Accordingly, dielectric barrier discharge devices typically include a pair of electrodes separated by a dielectric material. The voltage applied to at least one of the electrodes is typically cycled in a sinusoidal fashion to ionize the adjacent air. While the foregoing approach has been shown to create the desired effect on the boundary layer at particular flight conditions, there remains a need to control the boundary layer at other conditions, including high load conditions, and particularly buffet conditions, such as those experienced by multi-role air fighter aircraft and other high performance aircraft.

SUMMARY

The following summary is provided for the benefit of the reader only, and is not intended to limit in any way the invention as set forth by the claims. A particular embodiment of the disclosure is directed to a method for operating an aircraft and includes receiving an input corresponding to an aircraft component structural response to an aerodynamic load (e.g., a buffet load). The method can further include, based at least in part on the input corresponding to the aircraft component structural response, reducing the structural response to the aerodynamic load by activating at least one plasma actuator carried by the aircraft, in accordance with one or more activation parameters. For example, in a particular embodiment, receiving an input includes receiving an input that in turn includes an amplitude, frequency and phase of the aircraft component structural response (e.g., the manner in which the aircraft structure responds to the aerodynamic load). Reducing the structural response can include altering the amplitude of the aircraft component structural response by generating an effect in a flow field adjacent to the component as a result of activating the at least one plasma actuator. In another particular embodiment, the aerodynamic load is a first aerodynamic load, and actuating the at least one plasma actuator includes generating a second aerodynamic load such that the fatigue effect on the aerodynamic component is less under the first and second loads than under the first load alone.

Other aspects of the disclosure are directed to systems for controlling an effect of aerodynamic loading. One such system includes a sensor, a plasma actuator, and a controller coupled to the sensor and the plasma actuator and programmed with instructions. The instructions can include instructions for receiving an input corresponding to an aircraft structural response to an aerodynamic load, and, based at least in part on the input, reducing the aircraft structural response by activating the plasma actuator in accordance with one or more activation parameters.

DETAILED DESCRIPTION

The following description is directed generally toward systems and methods for controlling flows with pulsed discharges, for example, via plasmas generated by dielectric barrier discharge devices or other plasma actuators. Several details describing structures or processes that are well-known and often associated with aspects of these systems and methods are not set forth in the following description for purposes of brevity. Moreover, although the following description sets forth several representative embodiments, several other embodiments can have different configurations or different components than those described in this section. As such, other embodiments of the disclosure may have additional elements or may eliminate several of the elements described below with reference to FIGS. 1-6C.

Several embodiments of the disclosure described below may take the form of computer-executable instructions, including routines executed by a programmable computer (e.g., a controller). Those skilled in the relevant art will appreciate that one or more embodiments can be practiced on computer systems other than those shown and described below. Instructions can be embodied in a special-purpose computer or data processor that is specifically programmed, configured or constructed to perform one or more of the computer-executable instructions described below. Accordingly, the term "computer" as generally used herein, refers to any data processor, and can include controllers, multi-processor systems, processor-based or programmable consumer electronics, network computers, mini-computers and the like.

Figure 1:
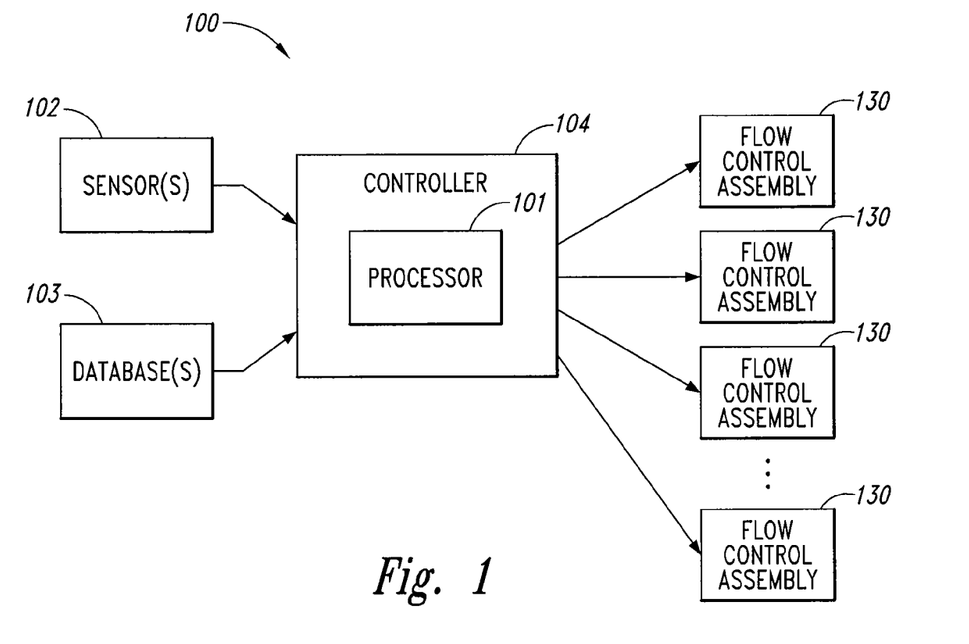
FIG. 1 is a schematic block diagram of a system configured in accordance with a particular embodiment of the disclosure.

FIG. 1 is a schematic block diagram of a system 100 used to control forces on an aircraft in accordance with an embodiment of the disclosure. In a particular embodiment, the system 100 can control (e.g., reduce or eliminate) the buffet loads on the aircraft, and can thereby improve the fatigue life of one or more aircraft components. In other embodiments, the system 100 can be used to control other aircraft loads and/or can achieve other improvements or results. In any of these embodiments, the system 100 can include one or more sensors 102 and/or one or more databases 103 that provide inputs to a controller 104. The inputs can be representative of, correspond to, and/or be associated with the structural response of one or more aircraft components to an aerodynamic load. Based on these inputs, the controller 104 can control the activation of one or more flow control assemblies 130 (e.g., via a computer-based processor 101). When activated, the flow control assemblies 130 influence the local flow, for example, by delaying or preventing flow separation. In particular embodiments, the expected result is a reduction in loads experienced by the aircraft, and in particular, buffet loads on the aircraft.

The sensors 102, which can provide inputs to the controller 104, can include any of a variety of suitable devices that either directly or indirectly measure or otherwise detect or identify aerodynamic loading and/or structural response. For example, the sensors 102 can include pressure transducers, structural strain gauges, and/or accelerometers. In particular embodiments, the sensors 102 are configured to measure varying loads on the particular aircraft component with which they are associated. These loads can vary in an unsteady manner. Accordingly, the sensors 102 can measure the magnitude, frequency, phase, and/or center of pressure location of the aircraft loading function.

In particular embodiments, one or more databases 103 can be used in addition to or in lieu of the sensors 102. For example, if the structural response of a particular component is a known function of flight condition, then the structural response may need not be measured directly, but can instead be identified or estimated based upon flight condition data. For example, if a particular component is known to have a particular structural response at a particular combination of flight speed and angle of attack, then the database 103 can be used in combination with measured values for angle of attack and Mach number to provide an input indicative of the component structural response when the angle of attack and Mach number are encountered.

The controller 104 can receive the inputs from the sensors 102 and/or the databases 103 and, based at least in part upon these inputs, direct the operation of the flow control assemblies 130. For example, the controller 104 can identify which of multiple flow control assemblies are activated at a particular flight condition, based upon the inputs received from the sensors 102 and/or the databases 103. In other embodiments, the frequency, phase, center of pressure location, and/or other activation parameter of the flow control assemblies 130 can be directed by the controller 104 depending upon the inputs received by the controller 104. In still further embodiments, the controller 104 can coordinate the operation of multiple flow control assemblies 130 so that the outputs of individual flow control assemblies 130 have particular relationships relative to the output of other flow control assemblies 130. For example, one flow control assembly 130 may be activated at a particular time and/or with a particular frequency, phase, center of pressure location, and another flow control assembly 130 may be activated at a different time and/or with a different frequency or phase relationship relative to the first control assembly 130, to produce a combined result that is enhanced relative to the results obtained by either flow control assembly 130 alone. The foregoing parameters for the flow control assemblies 130 (e.g., flow control assembly location, on/off state, operating frequency, amplitude and phase) are collectively referred to herein as activation parameters. General characteristics of a representative flow control assembly 130 are described below.

Figure 2:
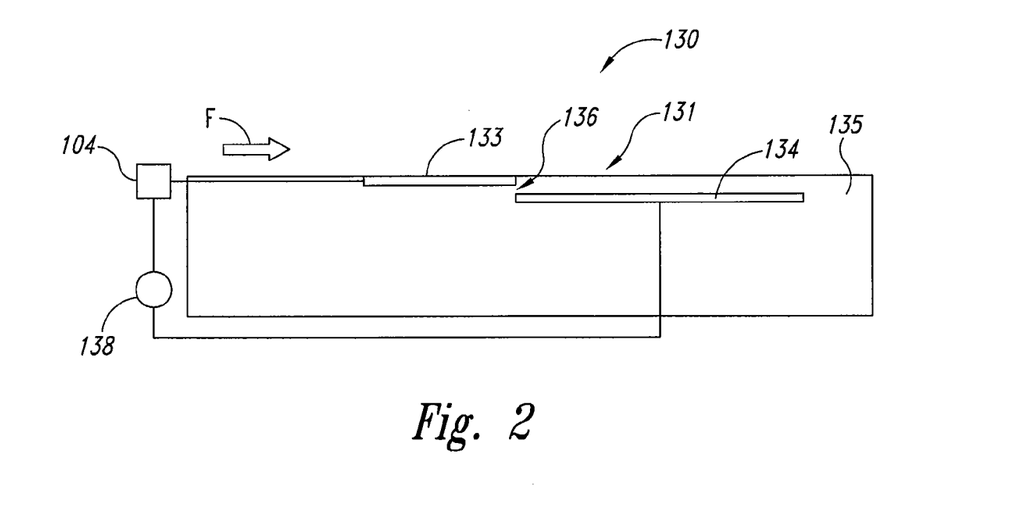
FIG. 2 is a schematic illustration of a flow control system, including components of an actuator, configured in accordance with an embodiment of the disclosure.

FIG. 2 is a partially schematic, cross-sectional illustration of a flow control assembly 130 that includes a representative actuator 131 configured in accordance with an embodiment of the disclosure. The actuator 131 can include a plasma actuator, e.g., a dielectric barrier discharge device, and accordingly, the term plasma actuator is used herein to include dielectric barrier discharge devices and other devices that operate primarily by ionizing the nearby flow field. The flow control assembly 130 can include more than one actuator 131, but a single actuator 131 is shown in FIG. 1 for purposes of illustration. The actuator 131 can include a first electrode 133, a second electrode 134, and a dielectric material 135 positioned between the first and second electrodes 133, 134. Accordingly, the first and second electrodes 133, 134 are separated by a gap 136.

In a particular embodiment, the first electrode 133 is located upstream (with reference to a local air flow direction F) from the second electrode 134, and the upper surface of the first electrode 133 is typically flush with the surrounding flow surfaces. The first electrode 133 is also typically "exposed" to the flow. As used in this context, "exposed" means that the first electrode 133 is in direct electrical contact with the flow, or at least more direct electrical communication with the flow than is the second electrode 134. The exposed first electrode 133 can accordingly include a protective coating or other material that restricts or prevents erosion due to environmental conditions, without unduly impacting the electrical communication between the first electrode 133 and the adjacent flow, e.g., without unduly impacting the ability to provide direct current coupling between the first electrode 133 and the adjacent flow. In other embodiments, the material forming the first electrode 133 can be selected to have both suitable electrical conductivity and suitable resistance to environmental factors. A representative material includes stainless steel.

In particular embodiments, the first electrode 133 can include a conductive environmental coating. For example, the first electrode 133 can include a coating formed from a thin layer of tungsten, tungsten carbide (or another tungsten alloy), nichrome or stainless steel. In other embodiments, the coating can include a semiconductive material that becomes conductive as the high voltages described above are applied to the first electrode 133. For example, the first electrode 133 can include a silicon or gallium arsenide bulk material treated with a suitable dopant (e.g., boron or phosphorus, in the case of silicon). In other embodiments, other suitable conductive and/or semiconductive materials can be applied to the first electrode. In any of these embodiments, the material can be selected to provide the necessary level of conductivity and the necessary resistance to environmental conditions, including resistance to rain erosion, oxidation and exposure to fuel and/or ice protection chemicals.

It is expected that the majority of the electric field lines emanating from the first electrode 133 will emanate from the trailing edge of the electrode. Accordingly, in at least some cases, the environmental coating can be applied to the majority of the exposed surface of the first electrode 133, leaving only a small, aft portion of the first electrode 133 uncoated. In such cases, the coating may be selected to be entirely non-conductive (e.g., a dielectric coating) without causing undue interference with the ionizing electrical field emanating from the first electrode 133.

The second electrode 134 can be covered or at least partially covered with the dielectric material 135, for example, to prevent direct arcing between the two electrodes. The first electrode 133 or the second electrode 134 is coupled to the controller 104, which is in turn coupled to a power supply 138 to control the power delivered to the first electrode 133 or the second electrode 134. The other electrode 133 or 134 may also be coupled to the power supply 138 and/or the controller 104, or may simply be grounded. The controller 104 can include a computer having a computer-readable medium programmed with instructions to direct a signal waveform to the first electrode 133, in a manner that is expected to enhance the efficiency and/or the effectiveness of the actuator 131.

In many instances, it is expected that relatively high voltage, narrow-width pulses can have a beneficial effect on boundary layers by delaying the transition from laminar to turbulent flow in the boundary layer, and/or by delaying the point at which the boundary layer separates from the surface adjacent to which it flows. However, in other instances, the pulses can have other characteristics, depending upon the specific design requirements. Further details of representative pulsed discharge actuators are included in AIAA paper 2007-941, titled "Pulsed Discharge Actuators for Rectangular Wing Separation Control" (Sidorenko et al.) presented at the 45th AIAA Aerospace Sciences Meeting and Exhibit, Reno, Nevada, Jan. 8-11, 2007. Suitable pulse generators are available from Moose Hill Enterprises, Inc. of 54 Jennie Dade Lane, Sperryville, Va. 22740.

Figure 3:
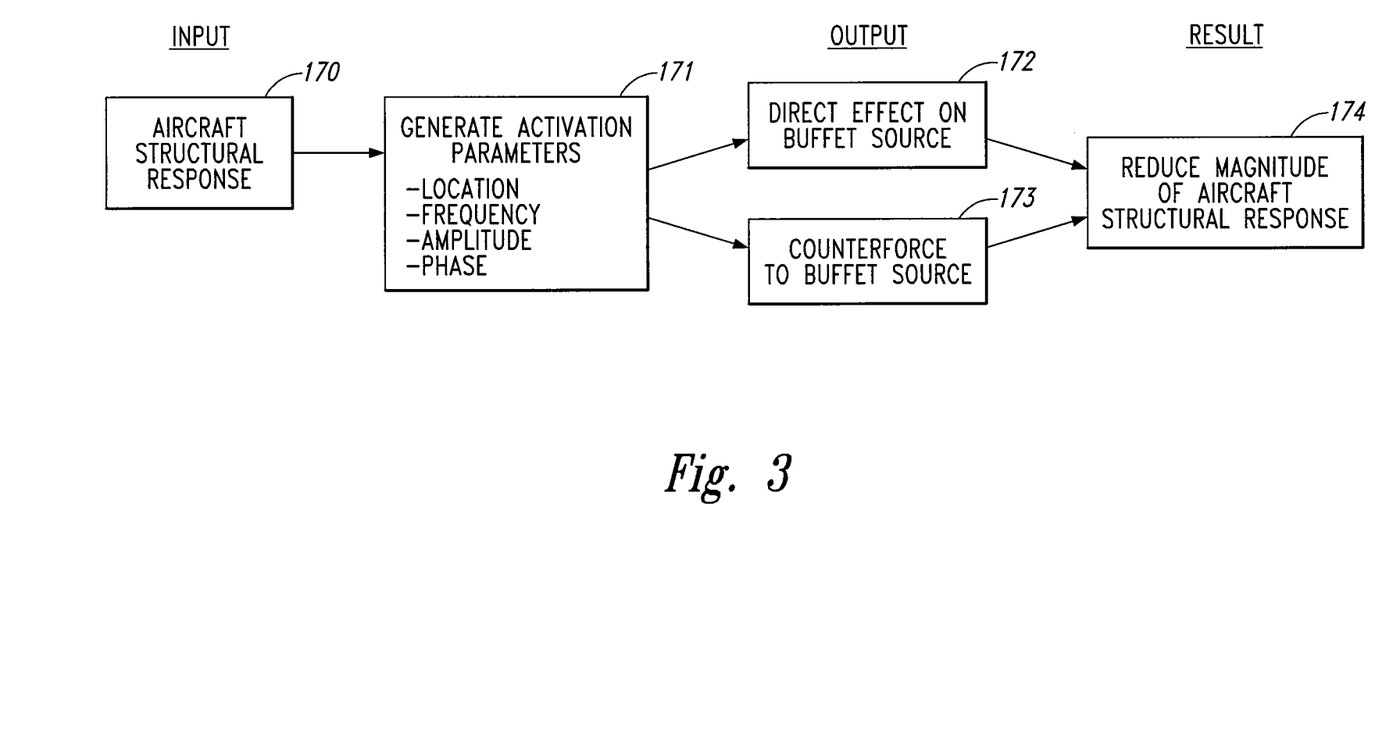
FIG. 3 is a block diagram illustrating functions performed by a system in accordance with an embodiment of the disclosure.

FIG. 3 is a schematic block diagram illustrating the functions provided by the system 100 shown in FIG. 1, including the flow control assembly 130 shown in FIG. 2. In block 170, an aircraft structural response indication is identified, via the sensors 102 and/or the databases 103 shown in FIG. 1. In block 171, the system 100 generates activation parameters for the flow control assemblies 130, including, for example, the location of active flow control assemblies, and for each active flow control assembly 130, the frequency, amplitude and/or phase relationship of signals delivered to and/or produced by that flow control assembly.

The output generated by the process described with reference to block 171 can include a direct effect on an aerodynamic buffet source or other aerodynamic forcing function (block 172), and/or a counterforce to the buffet source or other aerodynamic forcing function (block 173). The direct effect generally refers to an effect that reduces the magnitude of the buffet source, or in another manner shifts or changes an aspect of the buffet source, e.g., so as to reduce the coupling between the aerodynamic buffet source and one or more structural modes, and thus reduce the aircraft structural response and/or fatigue damage. A counterforce refers generally to a separately generated force that, in combination with the buffet source, can reduce the overall impact of the buffet source on the aircraft structural response. Accordingly, the direct effect and/or the counterforce can be used separately or in combination to produce a result that includes a reduction in the magnitude of the aircraft structural response, as indicated in block 174. The effect of the flow control assemblies 130 on the aircraft structural response is measured by the sensors 102. The system can update the activation parameters on the basis of this updated input so as to operate in a closed loop.

Figure 4:
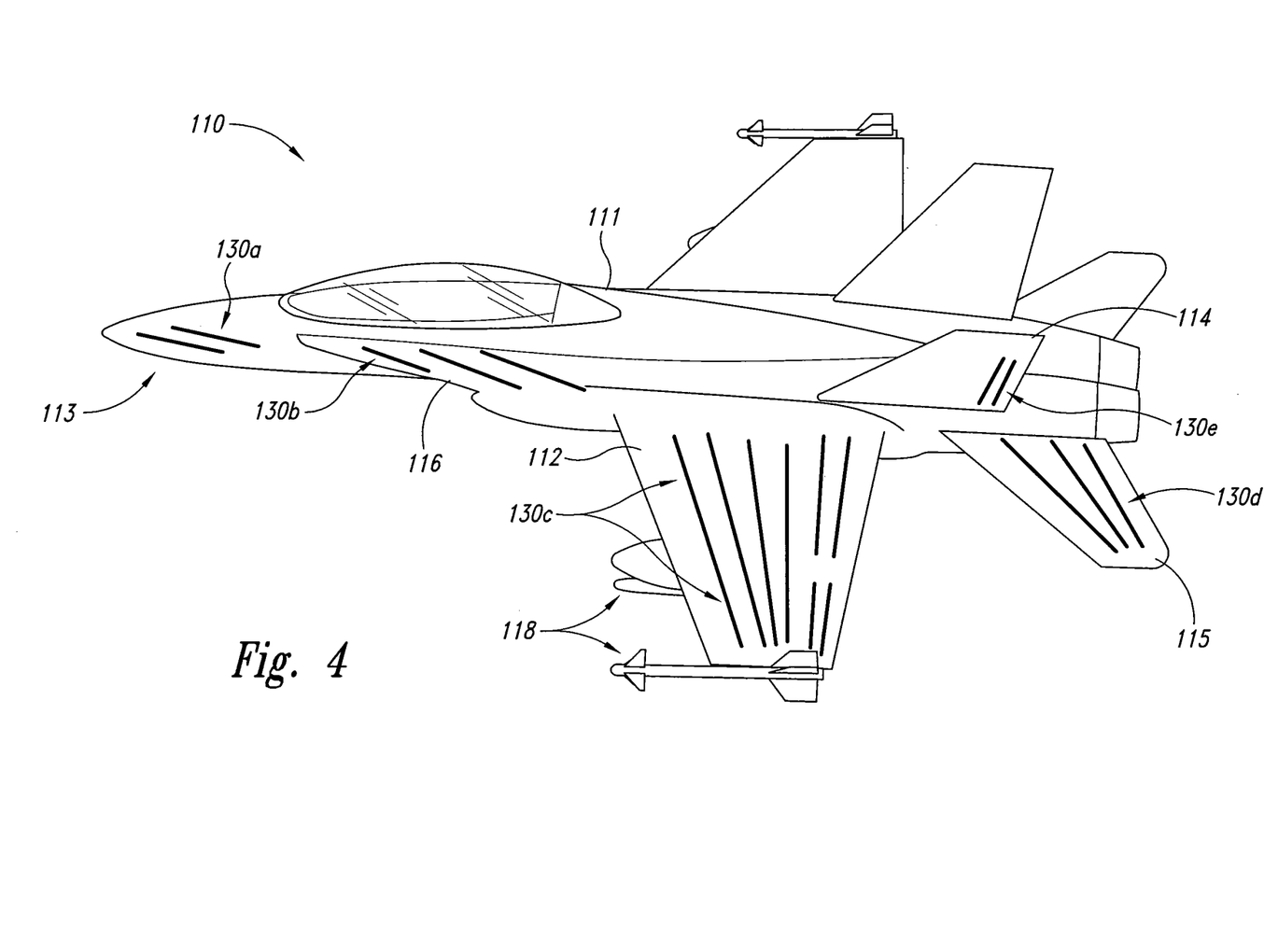
FIG. 4 illustrates an aircraft with representative locations for flow control assemblies in accordance with embodiments of the disclosure.

FIG. 4 is an illustration of an aircraft 110 having a variety of flow control assemblies distributed in accordance with an embodiment of the disclosure. For purposes of illustration, the aircraft 110 includes flow control assemblies disposed over a wide variety of the aircraft surfaces. In particular embodiments, the aircraft 110 can include more or fewer flow control assemblies positioned at particular subsets of the locations shown in FIG. 4, and/or positioned at locations other than those shown in FIG. 4.

The illustrated aircraft 110 includes a fuselage 111, wings 112, and a forebody 113. The aircraft 110 can optionally include a leading edge extension (LEX) 116 at the junction between the wing 112 and the fuselage 111. The aircraft 110 can also include vertical stabilizers 114 and horizontal stabilizers 115. In the illustrated embodiment, the aircraft 110 is a fighter aircraft and accordingly includes stores 118 carried by the wing 112 and/or the fuselage 111. In other embodiments, the aircraft 110 can be a transport aircraft (commercial or military), a rotorcraft, or another aircraft and can include features other than or in addition to those shown in FIG. 4.

Representative flow control assemblies 130 are shown in FIG. 4 as first flow control assemblies 130a positioned at the forebody 113, second flow control assemblies 130b positioned at the leading edge extension 115, and third flow control assemblies 130c positioned at the wing 112. Fourth flow control assemblies 130d can be positioned at the horizontal stabilizer 115, and fifth flow control assemblies 130e can be positioned at the vertical stabilizer 114. Any of a variety of individual flow control assemblies 130 and/or combinations of flow control assemblies 130 can be activated to control the structural response of one or more aircraft components to an aerodynamic loading function, for example the unsteady loading produced by unsteady separated flow, oscillating shock waves, or shedding vortices, which create a buffet effect on the aircraft. In a representative example, the first flow control assemblies 130a can be activated at the forebody 113 to directly impact (e.g., reduce the effect of) vortices that may shed from the forebody 113 at particular flight conditions. Similarly, the second flow control actuators 130b can be activated to reduce the effect of vortices shed from the leading edge extension 116. In another example, the third flow control assemblies 130c can be activated at the wing 112 to reduce the effect of oscillating shock waves, vortical flow, and/or separated flow on the wing or on other structures, e.g., by having a direct effect on the shock waves, vortex, and/or flow separation.

In another embodiment, the third flow control assemblies 130c can create a counter aerodynamic force that counters the effect produced by vortices, shocks, and/or separated flow emanating from the stores 118. Accordingly, as discussed above with reference to FIG. 3, selected flow control assemblies or combinations of flow control assemblies can be activated to have a direct effect on selected aerodynamic forces, and/or can generate a separate force that counters the targeted aerodynamic force.

Figure 5A:
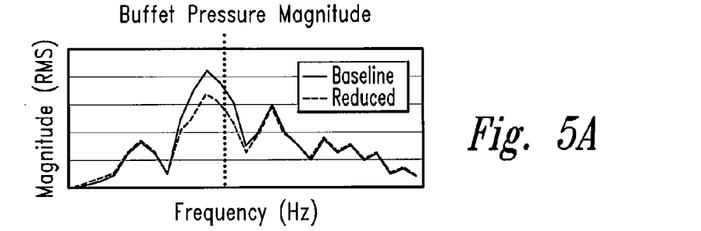
FIGS. 5A-5E are graphs illustrating expected results associated with activating flow control assemblies in accordance with particular embodiments of the disclosure.
Figure 5B:
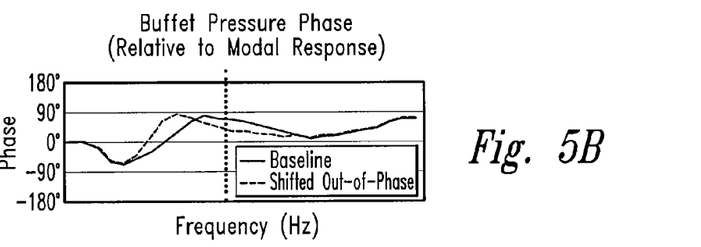
Figure 5C:
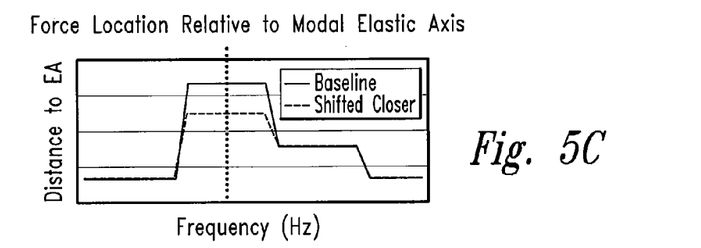
Figure 5D:
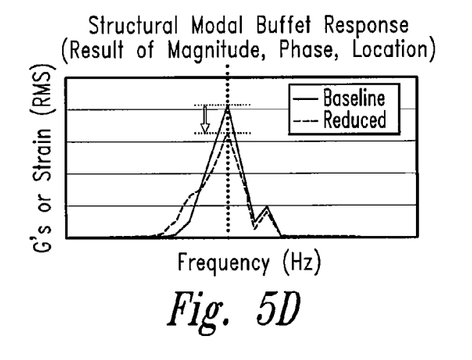

FIGS. 5A-5C are graphs illustrating features of a representative aerodynamic forcing function, e.g., a buffet load, with (in dashed lines) and without (in solid lines) the influence of one or more flow control assemblies in accordance with a particular embodiment of the disclosure. Each graph illustrates a different characteristic of the forcing function (along the Y axis) as a function of the forcing function frequency (along the X axis). Accordingly, FIG. 5A illustrates the magnitude of the forcing function, FIG. 5B illustrates the phase of the forcing function relative to the relevant aircraft structural modal response function, and FIG. 5C illustrates the distance between the effect of the forcing function on the aircraft (e.g., the center of pressure) and the relevant modal elastic axis. FIG. 5D illustrates the aircraft structural response (e.g., buffet response) as a function of frequency, with (in dashed lines) and without (in solid lines) the influence of flow control assemblies in accordance with a particular embodiment of the disclosure. The following discussion accordingly refers to FIGS. 5A-5D.

In each of the following Figures, the baseline forcing function (shown in solid lines) is schematically illustrated, based generally on typical forcing functions for tactical aircraft. The improved forcing function (in dashed lines) is representative of an expected change in the baseline forcing function resulting from activation of one or more flow control assemblies. Any given set of parameters in accordance with which the flow control assemblies are activated can have an effect on the magnitude and/or phase and/or location of the forcing function peak. Any one or combination of the effects illustrated in FIGS. 5A-5C can create the effect on the structural response shown in FIG. 5D. For example, any of the effects illustrated in FIGS. 5A-5C can reduce the strain and/or acceleration experienced by the structure at a target frequency, typically the frequency that produces the maximum structural response.

The parameters that can be selected to have the desired effect on the structural response (e.g., the activation parameters) include the location of the actuator that is activated, the amplitude of the output produced by the actuator, the phasing of the output relative to the aerodynamic forcing function, and/or the frequency of the signal. For example, for an aircraft that includes multiple actuators, particular actuators can be selected to have a particular effect depending upon flight conditions and the particular structure for which the response is to be reduced. The amplitude of the actuator output can be controlled by controlling the voltage or current applied to the actuator, and the phasing of the actuator output can be controlled by adjusting the phase of the signal applied to the actuator relative to the phase of the structural response function and/or the forcing function. For example, in at least some cases, it is desirable to activate the actuator so that its output is in phase with the aerodynamic forcing functions that are typically about +90° out of phase with coupling structural modes (e.g., for maximum potential response). The particular phase relationship can depend on factors that include the form of the particular operation performed by the system, the characteristics of the feedback system, the modal response characteristics, and/or whether the effect of operation is to delay or reduce separation, shock oscillation and/or vortex shedding so as to impact source magnitude, phase, position and/or frequency relative to the structural coupling characteristics. The frequency characteristics of the actuator output can be controlled by controlling the frequency of the signal applied to the actuator, and can be a single frequency selected to produce a beneficial reduction in the structural response, or multiple superimposed frequencies, for example, when the structural response has several modes which are to be suppressed. In general, it is expected that the actuator will output a frequency close to the structural mode frequency of interest, e.g., within 1-2% of the structural mode frequency. The presence of feedback sensors 102 (FIG. 1) is expected to produce at least this level of accuracy.

FIG. 5A illustrates that the baseline aerodynamic forcing function has a peak offset relative to the peak structural response frequency which is indicated by a vertical dotted line and shown in FIG. 5D. With proper selection of any of the foregoing activation parameters, the magnitude of the aerodynamic forcing function can be reduced, e.g., the forcing function line can be shifted downward as shown in dashed lines in FIG. 5A. In addition, or instead of shifting the magnitude of the aerodynamic forcing function downward, the effect of the flow control assembly actuation can be to frequency-shift the aerodynamic forcing function curve away from the peak structural response curve, e.g., to the left in FIG. 5A, thus reducing the coupling between the forcing function and the response function at the peak response frequency.

FIG. 5B illustrates the effect of a representative activation parameter selection process that results in the phase of the aerodynamic forcing function shifting at the target structural response frequency. For example, as shown in FIG. 5B, the baseline aerodynamic forcing function is approximately 90° out of phase with the structural response frequency at the target structural response frequency, which is typically the worst phase relationship because it maximizes the effect of the aerodynamic forcing function on the structure. The shifted aerodynamic forcing function (shown in dashed lines) is reduced to approximately 45° out of phase relative to the modal response. This effect can have a significant impact (e.g., reduction effect) on the structural coupling and thus the response to the aerodynamic forcing function.

FIG. 5C illustrates a representative effect resulting when the selected activation parameters produce a shift (e.g., reduction) in the distance between the location at which the forcing function affects the aerodynamic structure (the center of pressure), and the modal elastic axis. In other words, FIG. 5C illustrates that activation of the appropriate actuator(s) with appropriate signal delivery parameter can reduce the moment arm between the center of pressure of the forcing function force and the modal axis, which can in turn reduce the structural response.

As noted above, any of the foregoing parameters can be selected to affect one or more of the foregoing characteristics (e.g., magnitude, phase, and distance relative to the elastic axis). It is expected that, in general, selecting a particular parameter may affect two or more of the foregoing characteristics. In such cases, the designer can identify which characteristic is of primary importance and focus the effect of the parameter selection on that characteristic. Optimization software (e.g., artificial intelligence software) can be used to aid the designer in selecting the appropriate activation parameters, including actuator location.

Figure 5E:
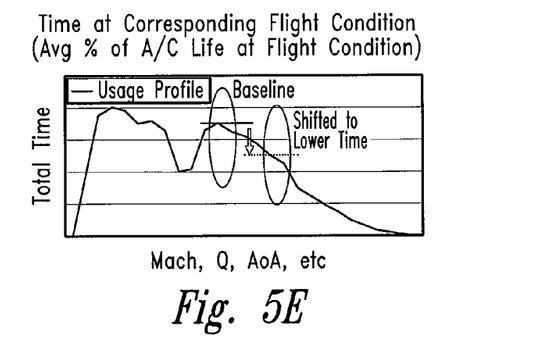

FIG. 5E illustrates another potential benefit of selecting appropriate activation parameters for one or more flow control assemblies in accordance with a particular embodiment. FIG. 5E illustrates the total time the aircraft spends over the course of its life as a function of any of a set of representative flight conditions (e.g., Mach number, dynamic pressure, angle of attack, and/or others). FIG. 5E also illustrates where the expected maximum structural responses are located as a function of flight condition, with (see dashed horizontal line) and without (see solid horizontal line) the flow control system activated. Accordingly, when the flow control assemblies are activated, the maximum structural response can be shifted to a flight condition at which the aircraft spends less time. Because the aircraft spends less time at the flight condition resulting in the maximum structural response, the fatigue life of the aircraft can be improved.

Figure 6A:
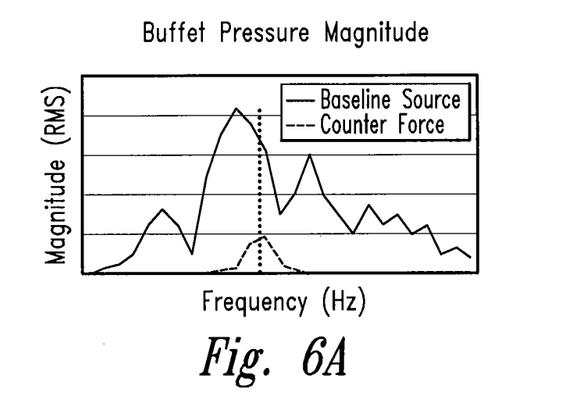
FIGS. 6A-6C illustrate expected results associated with activating flow control assemblies in accordance with further embodiments of the disclosure.
Figure 6B:
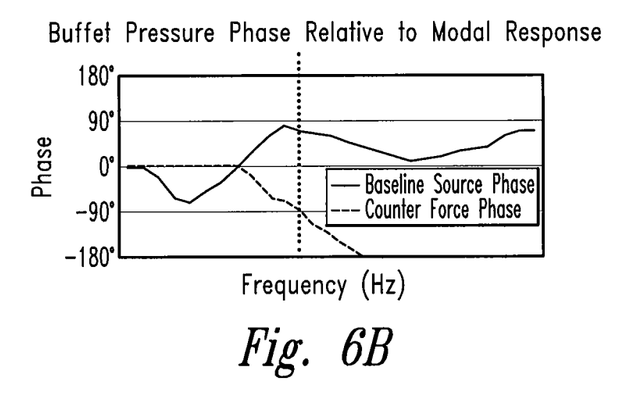
Figure 6C:
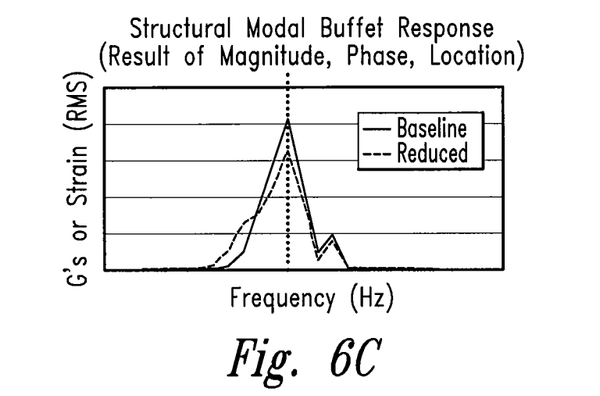

FIGS. 6A-6C illustrate representative graphs identifying the effect on the magnitude and phase, respectively, of the aerodynamic forcing function when the flow control assemblies are activated so as to generate a counterforce to the baseline forcing function, rather than a direct effect on the forcing function, as was described above with reference to FIGS. 5A-5E. In representative embodiments, the counterforce can be applied to a wing tip, wing trailing edge or other location where the applied counterforce is expected to have a significant impact on a selected structural response function. For example, in FIG. 6A, a counterforce has been added to the forcing function, instead of reducing the peak magnitude of the forcing function itself. In FIG. 6B, the counterforce has a different phase relationship than does the baseline forcing function. For example, the counterforce can be provided at −90° relative to the structural response, so as to be 180° out of phase with the baseline force. This is expected to have the greatest impact (e.g., reduction) on the baseline force. Though not shown in the foregoing Figures, the counterforce can also be selected to achieve a particular bending moment result, torsion result, or other similar result in a manner generally analogous to the shift in distance relative to the modal elastic axis described above with reference to FIG. 5C. The foregoing effects can be combined, in a manner generally similar to that discussed above with reference to FIGS. 5A-5C. In any of these cases, the result of the counterforce (via magnitudes, phase, and/or location) can be to reduce the structural response, as is shown in FIG. 6C. In addition, though not shown in FIGS. 6A-6C, the result of reducing the structural response of the aircraft component can be to shift the maximum structural response to a flight condition that is experienced less often by the aircraft, in a manner generally similar to that discussed above with reference to FIG. 5E. In some cases, applying a counterforce can be used in lieu of providing a direct effect on the aerodynamic forcing function, and in other cases, the two approaches can be used together to reduce the structural response and improve component fatigue life.

One feature of several of the foregoing embodiments is that the flow control assemblies used to produce the targeted effects on the structural response of one or more selected aircraft components include plasma actuators. In particular, the plasma actuators can be used to change the location and/or characteristics of boundary layer transition from laminar to turbulent flow, and/or flow separation. These effects can in turn affect the location and/or characteristics of ensuing unsteady flow phenomena, including, but not limited to, vortex shedding, flow separation onset, and shock oscillation. The use of plasma actuators to achieve this effect can have several benefits when compared with other methodologies that may be used to suppress structural responses at or near buffet and/or other conditions. For example, some existing systems use standard control surfaces (e.g., elevators, elevons, rudders, and/or ailerons) to produce a force that counters the aerodynamic forcing function. However, the use of such flight control surfaces is generally limited by the relatively low frequency capability at which such surfaces are able to move. Accordingly, for high frequency forcing functions, such as those that result from vortex shedding, oscillating shocks, and/or other buffet generators, conventional control surfaces may be inadequate to respond sufficiently to the aerodynamic forcing function.

Another existing flow control technique includes blowing and/or sucking air at the aerodynamic surface. While this approach can have a better frequency response than moving control surfaces, it is still expected that the response rate will be insufficient to overcome the effects of high frequency, unsteady buffet flow phenomena. Still another control technique includes using piezoelectric actuators to change the characteristics (e.g., shape) of an aerodynamic surface. Piezoelectric actuators can have high frequency response characteristics (e.g., relative to blowing and sucking), but typically do not produce a force having a magnitude sufficient to counter the aerodynamic forcing function. Accordingly, it is expected that the use of plasma actuators to directly affect the aerodynamic forcing function, and/or to produce a force that is counter to the aerodynamic forcing function, will significantly reduce the aircraft structural response and, accordingly, improve the fatigue life of the aircraft. For example, it is expected that a 10% reduction in the RMS strain and/or acceleration experienced by an aircraft component can double the fatigue life of the aircraft component. In other embodiments, the foregoing parameters can be selected to produce other reductions in the structural response, and corresponding improvements in fatigue life.

Another expected advantage of at least some of the foregoing features is that the selected use of the plasma actuators in the manners described above can allow an aircraft to operate, or operate for additional periods of time, at conditions that might otherwise be placarded out of the typical operating range for the aircraft. Accordingly, the aircraft can be more versatile in that it can be operated over a wider variety of conditions.

Still another advantage of at least some of the foregoing features is that the ability to control buffet via the plasma actuators can reduce the structural requirements for components that are otherwise subjected to significant buffet loads. As a result, the weight of these components can be reduced, allowing the aircraft to carry a greater payload and/or fuel load.

Yet another advantage of at least some of the foregoing features is that the feedback-loop arrangement resulting from the use of sensors in combination with the highly responsive plasma actuators can allow for real-time or nearly real-time changes in the manner in which the actuators are activated. For example, as flight conditions rapidly change, the buffet loads can also rapidly change, and the real-time or nearly real-time response of the sensors and actuators can quickly compensate for such changes. Furthermore, in at least some embodiments, the structural response of the aircraft to buffet loads may change over the life of the aircraft. As this occurs, the feedback-loop arrangement can automatically account for such changes and provide an optimized or nearly optimized response over the lifetime of the aircraft.

From the foregoing, it will be appreciated that specific embodiments of the invention have been described herein for purposes of illustration, but the various modifications may be made in other embodiments. For example, the foregoing parameters described above with reference to the forcing function and resulting structural mode responses can be different than those illustrated in the foregoing Figures and the associated activation parameters selected for the flow control devices can also be different. Certain aspects of the invention described in the context of particular embodiments may be combined or eliminated in other embodiments. For example, actuators selected to have a direct effect on the aerodynamic forcing function can be combined with actuators selected to produce a counterforce to the forcing function. Further, while advantages associated with certain embodiments have been described in the context of those embodiments, other embodiments may also exhibit such advantages, and not all embodiments need necessarily exhibit such advantages to fall within the scope of the invention. Accordingly, the disclosure can include other embodiments not specifically shown or described above.

We claim:

1. A method for establishing operational parameters for an aircraft, comprising:
    receiving a baseline structural response profile corresponding to expected total flight time of the aircraft as a function of flight condition, the profile including an expected structural response level at a first corresponding total flight time value;
    selecting activation parameters for one or more plasma actuators carried by the aircraft based on an effect of the parameters to shift the total flight time value at which the expected structural response level occurs from the first corresponding total flight time value to a second corresponding total flight time value less than the first; and
    programming a controller coupled to the one or more plasma actuators in accordance with the selected activation parameters.

2. The method of claim 1 wherein receiving a baseline structural response profile includes receiving an input that in turn includes an amplitude, frequency and phase of an aircraft component structural response, and selecting activation parameters includes selecting activation parameters that alter the amplitude of the aircraft component structural response by generating an effect in a flowfield adjacent to the one or more plasma actuators.

3. The method of claim 1 wherein selecting activation parameters includes selecting activation parameters that, when implemented, increase a fatigue life of a component of the aircraft.

4. The method of claim 1 wherein selecting activation parameters includes selecting activation parameters that, when implemented, directly reduce an aerodynamic load on the aircraft.

5. The method of claim 1 wherein selecting activation parameters includes selecting activation parameters that, when implemented, control a location at which a shock is formed in a flow adjacent to a surface of the aircraft.

6. The method of claim 1 wherein selecting activation parameters includes selecting activation parameters that, when implemented, control a location at which a boundary layer transition occurs in a flow adjacent to a surface of the aircraft.

7. The method of claim 1 wherein selecting activation parameters includes selecting activation parameters that, when implemented, shift a location at which the aerodynamic load is positioned, relative to an elastic axis of a component of the aircraft.

8. The method of claim 7 wherein the activation parameters, when implemented, reduce a moment on a component of the aircraft resulting from the aerodynamic load by moving the location closer to the elastic axis.

9. The method of claim 1 wherein the structural response level has a representative response frequency and response phase and wherein selecting activation parameters includes selecting an activation frequency and an activation phase, the activation phase being approximately 90 degrees offset from the response phase.

10. The method of claim 1 wherein the expected structural response level is a peak structural response level.

11. The method of claim 1, further comprising reducing the structural response level by 10% or more.

12. The method of claim 1, further comprising reducing the structural response level.

13. The method of claim 1 wherein the flight condition includes Mach number.

14. The method of claim 1 wherein the flight condition includes angle of attack.

15. The method of claim 1 wherein the flight condition includes dynamic pressure.

* * * * *